United States Patent Office 3,580,704
Patented May 25, 1971

---

3,580,704
COLORIMETRIC INDICATORS FOR DETERMINING pH OF MOTOR OIL
John Pickup, Montreal, and Theodorus G. Brandts and Joseph A. Lichtenberger, Grand'Mere, Quebec, Canada, assignors to Consolidated Paper (Bahamas) Limited, Nassau, Bahamas
No Drawing. Filed Mar. 6, 1967, Ser. No. 620,683
Claims priority, application Canada, Mar. 10, 1966, 954,427
Int. Cl. G01m *21/08, 31/22, 33/26*
U.S. Cl. 23—230       7 Claims

ABSTRACT OF THE DISCLOSURE

The pH of a non-aqueous system which, normally, on contact of a pH color indicator, does not show a detectable change in the color of this indicator, is colorimetrically measured by use of a treated solid adsorbent carrier containing adsorbed thereon a suitable pH color indicator and a non-aqueous, substantially non-volatile liquid solvent common to said indicator and said system, by bringing the non-aqueous system in contact with the carrier. In a preferred embodiment, a method of indicating the pH of a motor oil is described which consists in contacting the used motor oil with a paper which has previously been treated with a pH colour indicator soluble in a non-ionic solvent and a surface-active agent which is a non-ionic solvent for said indicator and said motor oil.

BACKGROUND OF THE INVENTION

This invention relates to colorimetric indicators. More particularly, this invention relates to pH colorimetric indicators.

pH colorimetric indicators are chemical substances that show a definite but gradual colour change over a given pH range. This change is associated with the formation of a new substance which is generally a molecular rearrangement or tautomer of the old one. The colour given by a pH colour indicator is characteristic at a definite hydrogen-ion concentration. Thus, pH colour indicators can be used to estimate this concentration.

pH colorimetric indicators are normally used in aqueous systems. However, the need often arises of determining the pH of a substantially non-aqueous system in which the indicator is not soluble therein and if a pH colorimetric indicator is used in the usual manner the colour change does not occur or is masked by the system.

SUMMARY OF THE INVENTION

In accordance with the present invention, a method is provided for indicating the pH condition of a substantially non-aqueous system which normally on contact with a pH colorimetric indicator does not show a change of colour which consists in selecting a suitable pH colour indicator as well as a substantially nonaqueous liquid in which both the indicator and the system are soluble, and bringing said system and said indicator in contact with said solvent.

The pH colour indicator is selected in accordance with the pH to be determined so that the change of colour would theoretically occur over the pH range to be determined and in the presence of the particular solvent.

The system to be tested and the liquid solvent for the indicator and the system are substantially nonaqueous. Because of equilibrium moisture conditions and traces of water in the liquid and possibly also in the system, water is not completely absent. However, such conditions are clearly well defined as substantially non-aqeuous.

The liquid selected is non-volatile and will not evaporate except in very small amounts, if at all, at normal conditions i.e. room temperature (about 68° F.). over a reasonable period of a few days or more.

In one embodiment of the invention, the system and the indicator are brought in contact with the liquid solvent through means of a solid carrier. Special advantages derive from using, specifically, an adsorbent solid carrier which can be treated with the liquid solvent and the indicator. An absorbent solid carrier, treated in the aforesaid manner, can then simply be contacted with the system when the need arises of determining the pH of said system.

Thus, in accordance with said embodiment, a method is provided for determining the pH of a substantially non-aqueous system which normally on contact with a pH colour indicator does not cause a detectable change of colour, which consists in selecting a suitable pH colour indicator, selecting a substantially non-aqueous, non-volatile liquid solvent for said indicator and said system, treating a solid adsorbent carrier with said indicator and said liquid solvent and bringing said system in contact with said treated carrier.

The present invention further includes within its scope a solid adsorbent carrier treated in accordance with the aforesaid method for use in determining the pH of a substantially non-aqueous system.

A preferred embodiment of the present invention relates to its application to testing the condition of lubricating oil. Oil is used for cleaning and lubricating motors e.g. in automobiles, and for lack of a rapid and economical method of testing its condition, is discarded according to empirical rules based on the period of use or on the amount of time that the motor has been energized.

Lubricating motor oil is composed of a hydrocarbon base and various chemicals including cleaning agents which impart alkalinity and are usually surface active agents. During use, this oil becomes contaminated with insoluble and soluble contaminants, including acidic oxidation products. Wear in internal combustion engines is attributed to three factors: insoluble contaminants which have a dangerous abrasive action if allowed to build up to a dangerous level, failure of the oil film to perform its lubricating action on the rubbing surfaces and corrosive wear due to attack by acidic oxidation products and due to failure of the oil to perform its cleaning function. However, in the absence of faulty motor conditions, the effects of the first two factors on an engine fitted with efficient filters can be virtually eliminated, thus leaving as the controlling factor on motor wear the corrosive wear (Tourret et al., 1957 Proc, Inst. Mech. Engrs., London, pp. 539–542). Thus, corrosive wear on the motor can be controlled by testing the oil alkalinity during use and the performance of an oil can be related to its alkalinity. It has also been found by electrometric titration (A.S.T.M. Standard on Petroleum Products and Lubricants, Method D.664–54) that the full anti-wear effect of the oil is evident for the whole of the period during which some alkalinity is maintained in the oil. For practical purposes, the critical alkalinity can be set at about 0.00–0.02 mg./g., a level below which corrosive wear on the motor begins, (alkalinity being defined as the base neutralization number), corresponding to a pH of about 4.0.

Many practical difficulties arise, however, on carrying out the aforesaid electrometric titration which is also time-consuming.

In accordance with this embodiment of the invention, oil alkalinity can be determined accurately and rapidly by means of a colorimetric method.

In order to detect a pH of 4.0 colorimetrically, an indicator would be selected having a pK of 4.0. However, it must be remembered that this pK value refers to measurements in aqueous systems and that the pK value of an indicator varies according to the solvent. In general, the pK value of an indicator is from 1.0 to 2.0 higher in an organic solvent than it is in water. However, if the pK value of an indicator, otherwise suitable, is higher than the necessary value, acid can be added, and conversely, if the pK value is too low, alkali can be added to the carrier or to the solvent, in accordance with known principles to allow the indicator to change to the basic colour only when the alkalinity or acidity of the oil is sufficient to neutralize this acid or alkali and still have a pH greater or lower than the pK of the indicator. An indicator which fulfils these requirements most adequately without any corrective measures is bromphenol blue i.e. (tetrabromophenolsulfonphthalein).

For testing motor oil, the common solvent must be a non-ionic surface active solvent, preferably, a long-chain paraffinic compound containing hydroxy hydrophilic groups. A preferred solvent is a member of the group alkylaryloxy polyalkoxyalkanols, in which bromphenol blue is soluble.

DESCRIPTION OF PREFERRED EMBODIMENTS

The following non-limiting examples will further illustrate the present invention.

EXAMPLE I

Bleached kraft paper was treated with a 1% solution of bromphenol blue (tetrabromophenolsulfonphthalein) in a non-ionic surface-active agent sold under the trade mark Triton X-100 (alkylphenoxy polyethoxy ethanol) and manufactured by Rohm and Hass Company, Philadelphia, Pa. The treated paper was yellow.

When contacted with a motor oil having an alkalinity of 0.1 mg./gm., a sample of the treated paper turned blue. When treated with an oil having an alkalinity of 0.06 mg./gm., a further sample of the treated paper turned light green. The result of these tests indicates that the condition of the oil tested was good.

A motor oil having an alkalinity of 0.00-0.02 mg./gm. did not affect the colour of a further sample of the treated paper, indicating that the condition of the oil was poor and that the oil should be discarded.

Paper treated with other polyalkylaryloxy polyalkoxy alkanols gives similar adequate results.

For ease in detecting the change of colour in the above test, it was considered that the concentration of indicator should be at least 4 mg. per square foot of paper treated while the concentration of solvent in the paper should be at least 0.3 g. per square foot.

In the above test, paper was impregnated with the indicator and solvent. However, these chemicals can equally well be applied by spraying or printing techniques.

EXAMPLE II

Bleached kraft paper was saturated with an aqueous solution containing 5% Triton X-100 and 0.05% Bromphenol Blue. The treated paper was dried with a hot air blower or in a heated oven at a temperature of 95° C.

The dried treated paper was used in the same tests as shown in Example I, and gave the same results. The paper also gave the same results after being stored for over a month.

Motor oil is normally yellow. In order to eliminate any possibility that the colour reaction of the indicator be masked by the colour of the oil, it will be noted that in the aforesaid example, the indicator paper was yellow before testing and that the strong blue colour shown when the test was positive could not be masked.

The solid carrier is preferably a towel, e.g. a paper towel, which is easily available and convenient for use by service station attendants.

Other indicators can also be used, provided that proper adjustments are made accordingly. For example, for testing colourless transformer oil, one could use Alizarin Red S.

However, in its broader aspects, the present invention includes not only oil testing, but, generally, the testing of the pH of a system which cannot now normally be tested with a pH colour indicator.

Generically, other indicators that can be used also include bromocresol green and bromocresol purple.

We claim:
1. A method of colorimetrically determining the pH of a motor oil, which consists in:
   (a) selecting a suitable pH colour indicator,
   (b) selecting a substantially non-aqueous, non-volatile liquid solvent in which said indicator and motor oil are soluble, the solvent being an alkyl aryloxy polyalkoxy alkanol surface active agent,
   (c) treating paper with said indicator and said solvent whereby said indicator and solvent are adsorbed on said paper and said indicator is dissolved in said solvent, and subsequently
   (d) bringing said motor oil in contact with said paper.
2. A method of colorimetrically determining the pH of a motor oil which consists in:
   (a) selecting a suitable pH colour indicator,
   (b) selecting a substantially non-aqueous, non-volatile liquid solvent in which said indicator and motor oil are soluble, the solvent being an alkyl aryloxy polyalkoxy alkanol surface active agent,
   (c) treating paper with said indicator and said solvent whereby said indicator and solvent are adsorbed on said paper and said indicator is dissolved in said solvent,
   (d) drying said treated paper, and subsequently
   (e) bringing said paper in contact with said oil.
3. A method of colorimetrically determining the pH of a motor oil which consists in treating paper with tetrabromophenosulfonphthalein and as a solvent therefor a liquid alkyl aryloxy polyalkoxy alkanol surface active agent and subsequent contacting said treated paper with said motor oil.
4. A treated adsorbent paper for colorimetrically determining the pH of motor oil on contact with the same, said paper containing adsorbed thereon a suitable pH colour indicator and a substantially non-aqueous, non-volatile liquid solvent in which said indicator and said motor oil are soluble, said solvent being an alkyl aryl polyalkoxy alkanol surface active agents.
5. A paper as defined in claim 4, wherein said indicator is tetrabromosulfonphthalein.
6. A treated, dry adsorbent paper for colorimetrically determining the pH of motor oil on contact with the same, said paper containing adsorbed thereon a suitable pH colour indicator and a substantially non-aqueous, non-volatile liquid solvent in which said indicator and said motor oil are soluble, said solvent being alkyl aryl polyalkoxy alkanol surface active agent.
7. A paper as defined in claim 6, wherein said indicator is tetrabromosulfonphthalein.

References Cited
UNITED STATES PATENTS

| | | | |
|---|---|---|---|
| 2,770,530 | 11/1956 | Bergstrom et al. | 23—230HC |
| 3,030,190 | 4/1962 | Seemann et al. | 252—408 |
| 3,238,020 | 3/1966 | Eiseman, Jr. | 23—230 |
| 3,259,463 | 5/1966 | Feasley, et al. | 23—230 |

MORRIS O. WOLK, Primary Examiner

E. A. KATZ, Assistant Examiner

U.S. Cl. X.R.

23—253; 252—408